(12) United States Patent
Falstrup et al.

(10) Patent No.: US 9,908,482 B1
(45) Date of Patent: Mar. 6, 2018

(54) METHOD AND APPARATUS FOR CREATION OF THREE-DIMENSIONAL PHOTOGRAPHY OF AUTOMOTIVE VEHICLE INTERIORS FOR USE WITH A VIRTUAL REALITY DISPLAY

(71) Applicant: EVOX Productions, LLC, Rancho Dominguez, CA (US)

(72) Inventors: David Falstrup, Rancho Palos Verdes, CA (US); Ryan Murray, Los Angeles, CA (US); Alex McClain, Los Angeles, CA (US); Pat Hadnagy, Los Angeles, CA (US); Thom Denick, Los Angeles, CA (US); Claudia Nefately Ambriz, Pomona, CA (US)

(73) Assignee: EVOX Productions, LLC, Rancho Dominguez, CA (US)

( * ) Notice: Subject to any disclaimer, the term of this patent is extended or adjusted under 35 U.S.C. 154(b) by 151 days.

(21) Appl. No.: 15/081,752

(22) Filed: Mar. 25, 2016

Related U.S. Application Data

(60) Provisional application No. 62/139,486, filed on Mar. 27, 2015.

(51) Int. Cl.
*B60R 11/04* (2006.01)
*B60R 1/00* (2006.01)
*H04N 13/02* (2006.01)
*H04N 5/232* (2006.01)

(52) U.S. Cl.
CPC .............. *B60R 11/04* (2013.01); *B60R 1/00* (2013.01); *H04N 5/23238* (2013.01); *H04N 13/0221* (2013.01); *H04N 13/0253* (2013.01); *H04N 13/0282* (2013.01); *B60R 2300/107* (2013.01); *B60R 2300/8006* (2013.01)

(58) Field of Classification Search
CPC ........................... B60R 11/04; H04N 5/23238
See application file for complete search history.

(56) References Cited

U.S. PATENT DOCUMENTS

| | | | | |
|---|---|---|---|---|
| 2002/0167589 | A1* | 11/2002 | Schofield | B60N 2/002 348/148 |
| 2004/0032493 | A1* | 2/2004 | Franke | B60R 1/00 348/148 |
| 2010/0045773 | A1* | 2/2010 | Ritchey | G02B 13/06 348/36 |
| 2011/0175752 | A1* | 7/2011 | Augst | B60R 1/00 340/905 |

* cited by examiner

*Primary Examiner* — Mehrdad Dastouri
*Assistant Examiner* — Rowina Cattungal
(74) *Attorney, Agent, or Firm* — Thomas I. Rozsa

(57) ABSTRACT

A useful, novel and non-obvious method and apparatus for creative photography of three-dimensional automotive vehicle interior images providing a 360 degree view of an entire interior of an automotive vehicle or car (vehicle and car will be used interchangeable) for simulation of a virtual reality of the entire automotive interior through a virtual reality display used in conjunction with a virtual reality image gathering medium and related software applications to provide a virtual reality head mounted display of the automotive interior in both three dimensions and with a 360 degree review of the entire automotive interior.

6 Claims, 12 Drawing Sheets

METHOD AND APPARATUS FOR CREATION OF THREE-DIMENSIONAL PHOTOGRAPHY OF AUTOMOTIVE VEHICLE INTERIORS FOR USE WITH A VIRTUAL REALITY DISPLAY

CROSS-REFERENCE TO RELATED APPLICATION

This patent application claims priority to Provisional Application Ser. No. 62/139,486 filed on Mar. 27, 2015.

BACKGROUND OF THE INVENTION

1. Field of the Invention

The present invention relates to the field of photography of automotive interiors. The present invention further relates to the field of digital photography for use in conjunction with software applications for later presentation of the completed photographs in a corresponding medium.

2. Description of the Prior Art

The present inventors are not aware of any specific previous issued patent or published patent application which is the same as or similar to the present invention. To the best of the present inventors' knowledge, the invention as set forth in this patent application is useful, novel and non-obvious in accordance with the definitions of United States patent law.

SUMMARY OF THE INVENTION

The present invention is a useful, novel and non-obvious method and apparatus for creative photography of three-dimensional automotive vehicle interior images providing a 360 degree view of an entire interior of an automotive vehicle or car (vehicle and car will be used interchangeable) for simulation of a virtual reality of the entire automotive interior through a virtual reality display used in conjunction with a virtual reality image gathering medium and related software applications to provide a virtual reality head mounted display of the automotive interior in both three dimensions and with a 360 degree review of the entire automotive interior.

It is an object of the present invention to create stereoscopic panoramic photographic images of an entire automotive interior in both three dimensions and in 360 degrees.

It is a further object of the present invention to create the visual images on digital photography mediums which can be transferred via computer applications to be used in conjunction with a smartphone or other portable electronic device which is configured to be used in conjunction with viewing through a virtual reality head-mounted display.

It is a further object of the present invention to create a stereoscopic automotive interior panoramic photographic image which is achieved through having a separate set of photographs when viewed by a person through a person's right eye and subsequently viewed by the same person when viewed through the person's left eye, to combine the two separate images into a final assembled and stitched together three-dimensional 360 degree image.

It is a further object of the present invention to create the stereoscopic automotive interior panoramic photographic images to be used for viewing in virtual reality head-mounted displays.

It is still a further object of the present invention to create the finished completed three-dimensional 360 degree automotive interior content through several steps which are integrated with each other to create the final product. The sub-components of the special steps include:

1. Creation of stereoscopic panoramic photography of automotive interiors, achieved through selection of special lensing, cameras and use of images of each eye to combine together interocular separation by creating photographs as viewed from a right eye of a human person and a second set of photographs as viewed from a left eye of a human person and combining the photographs taken as viewed from the right eye of the person and the photographs taken as viewed from the left eye of the person and combining them through the present invention interocular separation to create a final optimal-interocular display image of the entire vehicle interior for subsequent transfer to a computer medium for incorporation into a computer software application downloadable to a portable electronic device such as a smartphone. The smartphone is used in conjunction with a virtual reality display through a head mounted display which is a headset with a pair of spaced apart arms respectively worn over the person's right and left ear or banded to encircle the back of a person's head with the smartphone removably affixed to a front portion the headset. The downloaded images in the smartphone are viewed through the headset with various activation members such as buttons on the headset pressed or otherwise activated by the person's fingers. The person looks at the removably attached smartphone through ocular viewing members such as lenses in the headset to view the entire virtual images of the interior of the vehicle or close-up views of selected areas of the interior of the vehicle such as the steering wheel, the dashboard console with instruments, one or both front seats, one or both rear seats or an entire rear seat if the rear seat is not separate bucket seats, etc.

2. In addition to receiving individual digital photographs of the interior of the vehicle or other computer generated images of the interior of the vehicle photographs of 360-degree views of the vehicle as viewed from a right eye and then a second matching set of photographs of 360-degree views of the interior of the vehicle as viewed from the left eye and then combining the two images through a computer application utilized through a special methodology to combine or stitch the set of images together to create stereoscopic panoramic images of the automotive interior to be viewed from a virtual reality display at any desired location selected from the group consisting of a head mounted display, a driver seat display, a passenger seat display, a rear seat display or a view looking through the front windshield of a vehicle or a view looking through the back windshield of a vehicle.

3. The present invention further includes post production of the stereoscopic panoramic images to ensure that all of the images are color matched throughout the entire three-dimensional 360-degree image and also are matching in content so that there is no overlap or visible seaming or stitching of one image to another, thereby giving the visual appearance of an entire interior of the automobile without viewing any component which have been individually photographed and placed together with other components.

It is a further object of the present invention to create a unique visual content of the automotive interior in both three dimensions and 360 degrees which is capable of being used in any head-mounted application or Sdk, including, but not limited to various virtual reality head-mounted displays, and other three-dimensional viewing devices which can be used in conjunction with a portable electronic device which receives all of the images through a computer download and then enables those images to be viewed when the portable electronic device is used in conjunction with a display member which is positioned so that the images on the portable electronic device can be viewed through the user's eyes, both with an individual eye with one eye closed and through both eyes for a stereoscopic virtual reality experience to examine the entire interior of the vehicle such as an automobile, truck and other land-based moving vehicles.

It is an additional object of the present invention to have a method and apparatus to create a process which utilizes pre-rendered images from a fixed point of view to enable product visualization and review, allowing the viewer to feel like the viewer is in the vehicle such as an automobile and enabling the viewer to be immersed in the vehicle interior through the three-dimensional 360-degree view.

It is an additional object of the present invention to create a three-dimensional 360-degree virtual image of the entire interior of a vehicle and to enable a viewer to determine where the blind spots are when seated in the driver's seat of a vehicle, color changes and component/feature configuration within the vehicle, text, image and video overlays for creation of the final viewed image, and use with other stereoscopic virtual reality content including various navigation assistance software such as computer icons or computer applications.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

I. Equipment Required for Utilization of the Present Invention Method and Corresponding Apparatus The following is a list of photographic equipment and related accessories which is the preferred equipment for use with the present invention. It is within the spirit and scope of the present invention to use similar, comparable or substitute equipment known to one skilled in the art as opposed to using the specific equipment and items set forth below. It will be appreciated that this is simply a recitation of the best method known to the inventors at the time this patent application was filed and is not intended to limit the course and scope of the specific equipment to achieve the new, novel and non-obvious results of the present invention.

Figure 1:
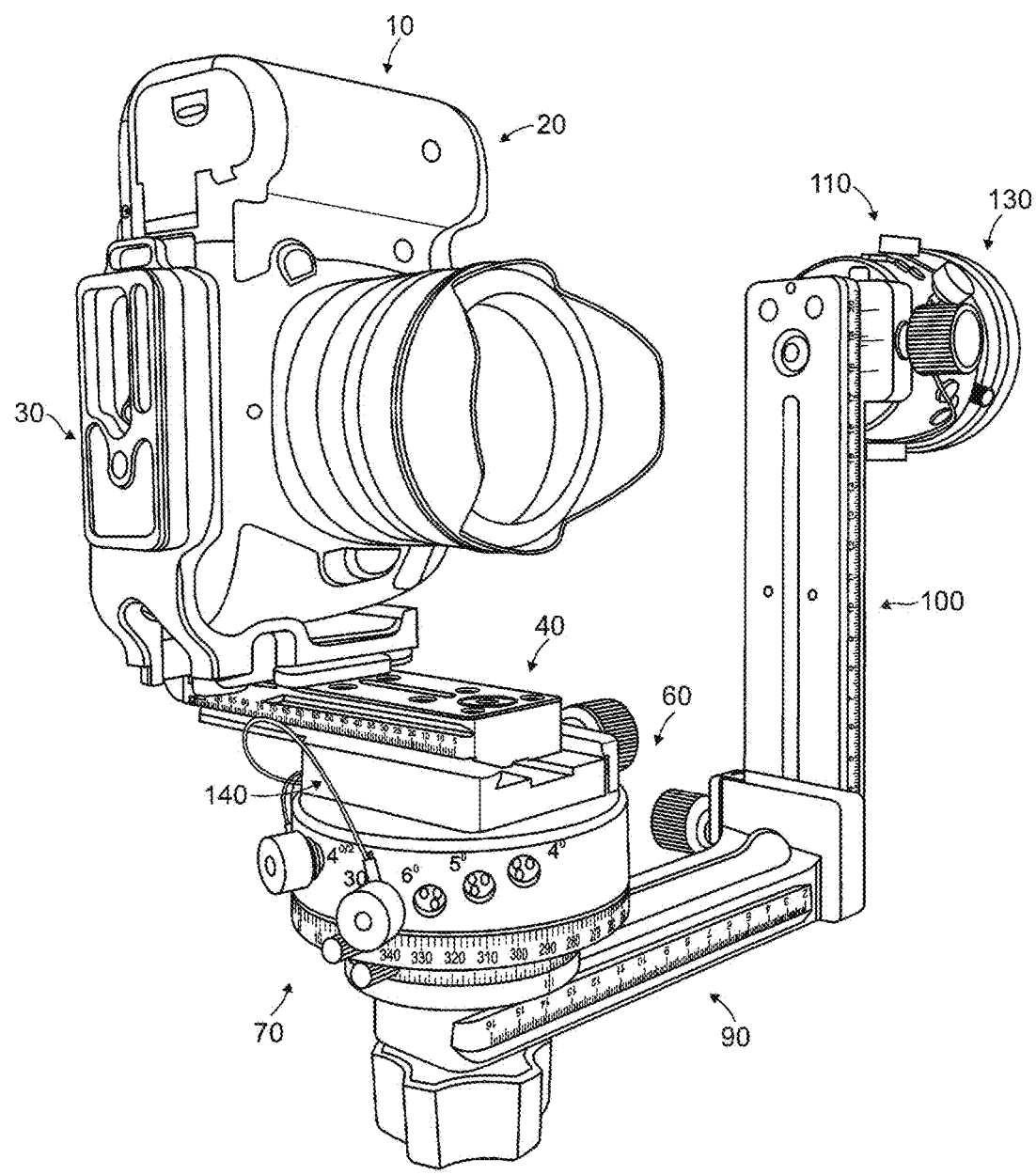
FIG. 1 is a perspective view of an assembled single camera stereo panoramic rig as one example of a portion of apparatus used for the method of the present invention.
Figure 2A:
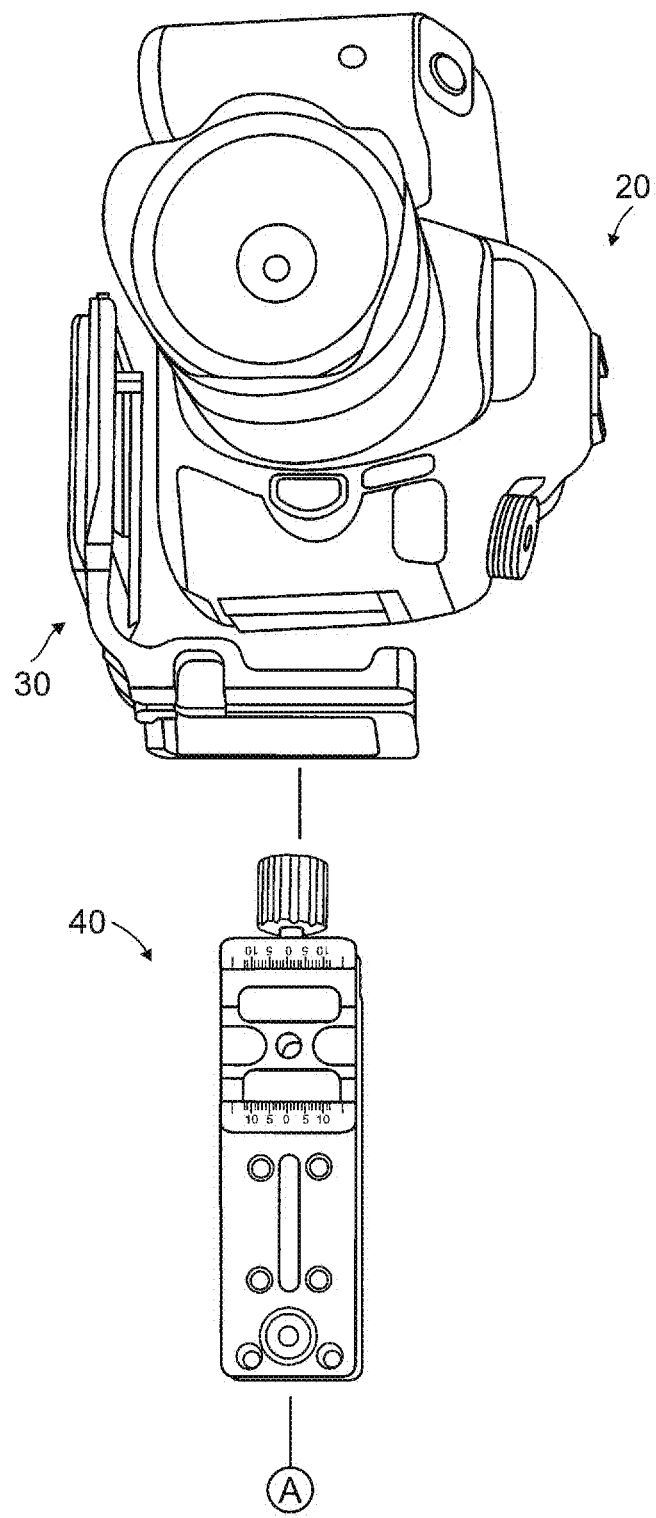
FIG. 2A is a partial exploded view of the components of the single camera stereo panoramic rig identified in FIG. 1.
Figure 2B:
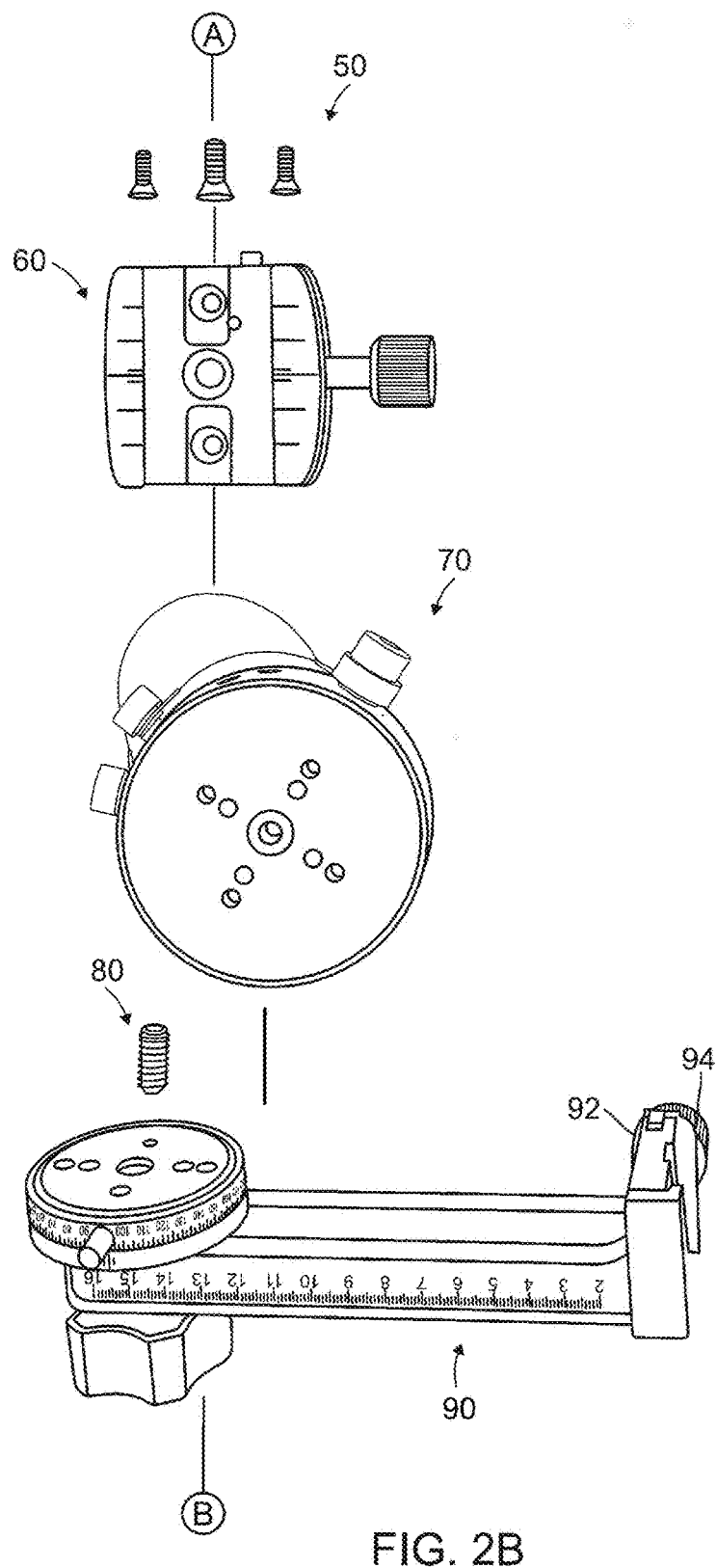
FIG. 2B is a continuing partial exploded view of remaining portions of the single camera stereo panoramic rig illustrated in FIG. 1.
Figure 2C:
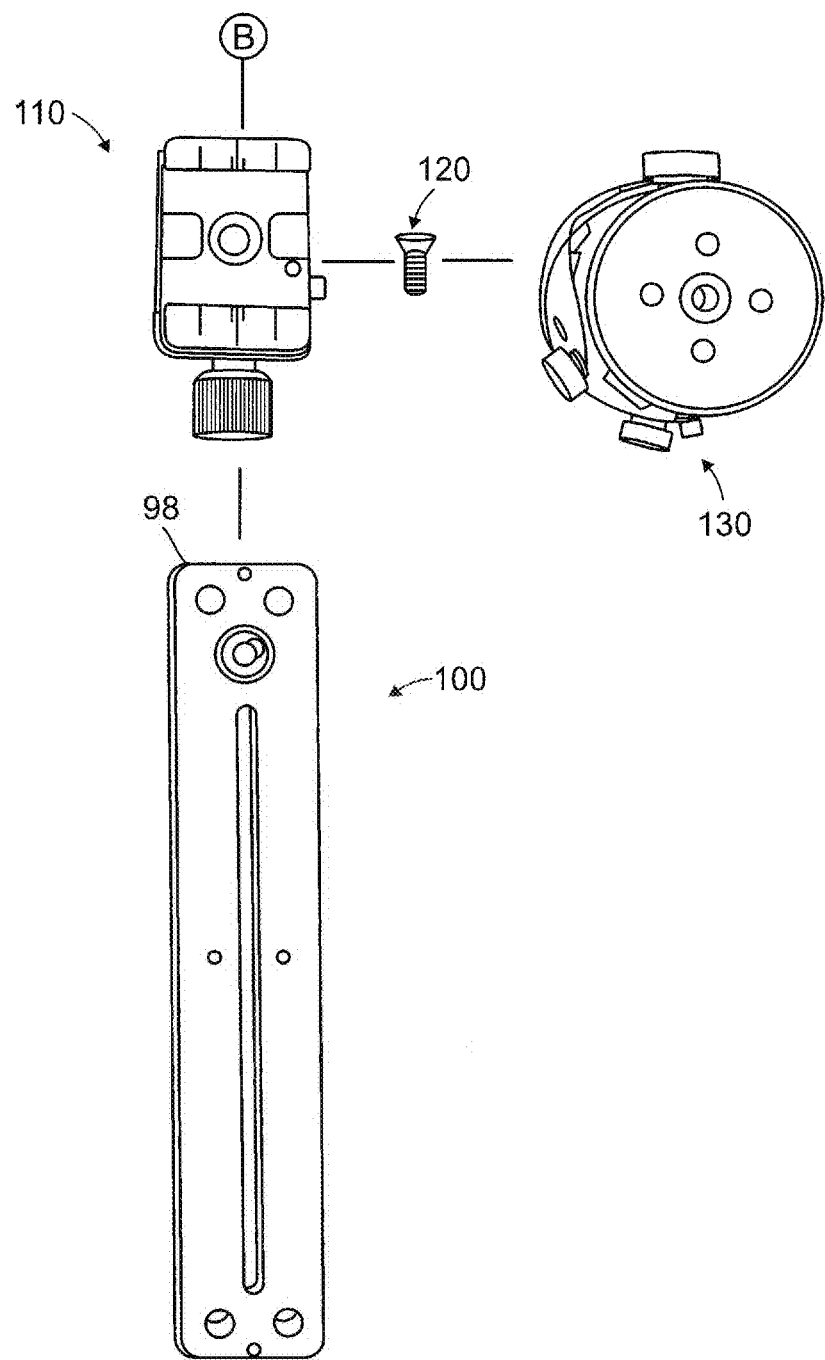
FIG. 2C is a broken away view of the Area-Swiss compatible plate with 90 degree clamp allowing camera to slide left and right depicted as part of FIG. 1.

Referring to FIG. 1 and to FIG. 2A, FIG. 2B and FIG. 2C, there is illustrated both in the assembled condition and in the exploded component condition, the assembled view of the single camera stereo panoramic rig 10. The components include a 35 mm. single lens reflex (SLR) camera system 20 (for example, Canon 5d Mark 3). The camera includes a full frame sensor. The camera preferably also has 20 mega pixels or higher with an auto exposure bracket feature. It will be appreciated that the present invention incorporates two duplicate single lens reflex cameras for use as will be described.

The present invention stereo panoramic rig includes a custom fit "Arca-Swiss" compatible L-shaped camera mount bracket 30. The custom fit keeps the camera from twisting on the head.

Further referring to FIG. 1 and FIG. 2A, there is illustrated the "Arca-Swiss" compatible plate with 90 degree clamp 40, allowing for the camera to slide left and right. Also illustrated are hex screws 50 for mounting the "Arca-Swiss" compatible clamp to the rotator base (see FIG. 2A). The equipment further includes an "Arca-Swiss" compatible clamp 60 (see FIG. 2A).

Referring to FIG. 1 and FIG. 2B, the equipment for the single camera stereo panoramic rig further comprises a large rotating panoramic base with adjustable degree increments 70. The rig also includes a threaded hex screw 80 for attaching the panoramic base 70 to the horizontal arm 90. The horizontal arm 90 includes a distal end 92 where a vertical "Arca-Swiss" compatible end clamp 94 is affixed to allow vertical arm attachments.

At the distal end 92 of the horizontal arm 90 and attached through the "Arca-Swiss" compatible end clamp 94 is a proximal end 96 of a vertical "Arca-Swiss" compatible plate 100. Affixed at the distal end 98 of the vertical "Arca-Swiss" compatible plate 100 is an "Arca-Swiss" compatible clamp 110. As part of the attachment mechanism there is included a hex screw 120 for mounting the "Arca-Swiss" compatible clamp to a small rotating panoramic base with adjustable degree increments 130. A remote trigger mechanism 140 enables photographs taken by the camera inside the vehicle to be triggered remotely from outside the vehicle.

In addition to the above specific apparatus, the present invention also utilizes the following additional equipment for performing the novel method to be hereinafter described:
a. A shutter release cable with extension to enable remote releasing of the camera.
b. 6-8 1,000 Watt Fresnel lights or comparable lighting kit utilizing these lights.
c. Diffusion and/or minus green gels.
d. A computer with Adobe Bridge, Photoshop, PTGui software or other comparable software.
e. Vehicle cleaning materials.
f. Measurement tools.
g. Gaffers tape.
h. A car battery charger.

Figure 3:
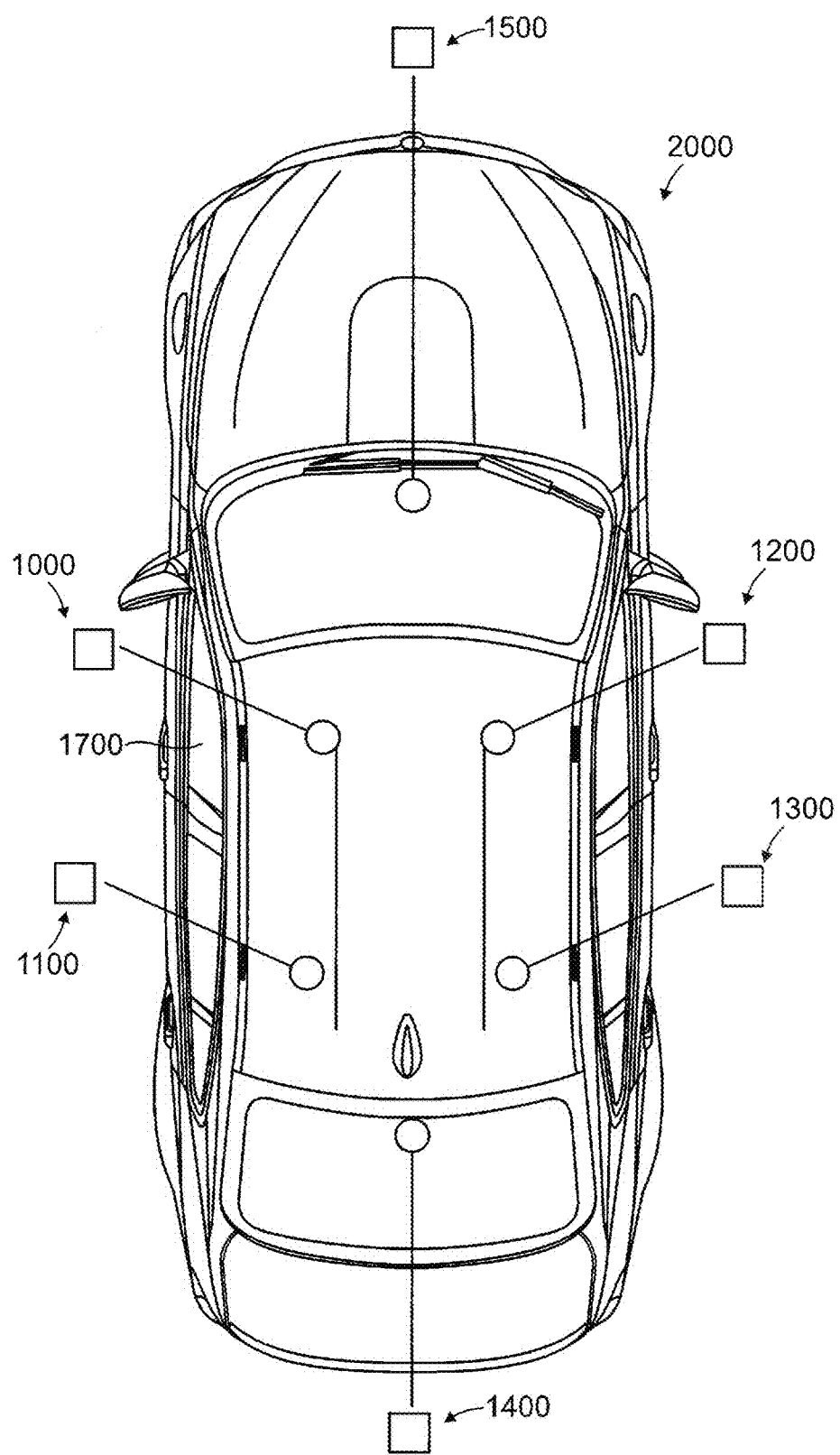
FIG. 3 is a top perspective view of the interior lighting setup with stereo panorama used for the method of the present invention.

II. Initial Steps to Create the Appropriate Lighting and Corresponding Setup for Appropriate Photography for Use in the Present Invention 1. Referring to FIG. 3, an initial step in the process is to place the vehicle in an enclosure or other suitable facility so there is at least 10-15 feet of clearance on all sides of the vehicle.
2. Roll down all windows and clean the car interior. Set the climate vents, control knobs, seat belt sliders, etc to same symmetries.
3. Connect the car battery to the battery charger so as not to drain the vehicle.
4. Place all glass windows with diffusion/minus green gel on the windows and trim so there is no overlap. (It is a principle that most vehicle windows have a soft shade of green and covering such windows with minus green eliminates the green tint when a photograph is taken through the window.) Then place 250 white diffusion on the windows. Trim or roll up to fit while making sure not to cover up vehicles side mirrors.
5. Cover all glass and open windows with diffusion gel.
6. Light the vehicle interior evenly, using a light through the front windshield, a light through the rear window, and a light from the side through each side window. Use four (4) 1 kilowatt lamps 2 on each side of the vehicle which direct light into the vehicle.

Referring to FIG. 3, the lamp configuration for lighting the set up in the stereo panorama is illustrated in the diagram view taken from above the vehicle. In FIG. 3 there is illustrated a basic light placement for the interior stereo panorama lighting setup. The setup usually consists of four one kilowatt lamps, two on each side of the vehicle and two 300 watt (one kilowatt lamps can be used for the front and back to replace the 300 watt lamps if needed) with one positioned at the front of the vehicle and one at the other side of the vehicle.

Referring to FIG. 3, with the vehicle 2000 on the ground, the lighting configuration is as follows:
a. Place a first lamp 1000 near to the driver window. This lamp should be placed approximately 3 feet away from the vehicle and 7 feet high (above the ground) at approximately a 45 degree angle. Light should be aimed more at the seat back and in full flood.
b. Place a second lamp 1100 near to the driver side rear window. This lamp should be placed approximately 3 feet away from the vehicle and 7 feet high (above the ground) at approximately a 45 degree angle. Light should be aimed more at the back of the seats creating an evenly lit back seat when used in conjunction with the other one kilowatt lamp (1300) positioned near the passenger side rear window.
c. Place a third lamp 1200 near to the passenger window. This lamp should be placed approximately 3 feet away from the vehicle and 7 feet high (above the ground) at approximately a 45 degree angle. Light should be aimed more at the seat back and in full flood.
d. Place a fourth lamp 1300 near to the passenger side rear window. This lamp should be placed approximately 3 feet away from the vehicle and 7 feet high (above the ground) at approximately a 45 degree angle. Light should be aimed more at the back of the seats creating an evenly lit back seat when used in conjunction with the other one kilowatt lamp (1100) positioned near the driver side rear window.
e. Place a 300 watt fifth lamp 1400 at the rear of the vehicle. Place the lamp approximately 3 feet away from the vehicle and 6 to 8 feet high (above the ground). Aim lamp to illuminate the center of the tops of the back seats.
f. Place a 300 watt sixth lamp 1500 at the front of the vehicle. Place the lamp approximately 3 feet away from the vehicle and 6 to 8 feet high (above the ground). Aim lamp to illuminate the center of the tops of the front seats.

7. Place the geared column arm onto the chosen camera support system so that it is coming off of the support at a right angle
8. Place the Nodal Ninja system onto the end of the column arm;
9. Mark the base onto the "Arca-Swiss" compatible L-shaped camera mount bracket plate, with tape and/or marker.
10. Place the camera with lens and "Arca-Swiss" compatible L-shaped camera mount bracket attached onto the Nodal Ninja system and ensure that it is on nodal point and level. It is important to note that when shooting both the left and right images, the camera will intentionally be off nodal point to prevent the two "eyes" converging and later reversing in the rotation.

Figure 4:
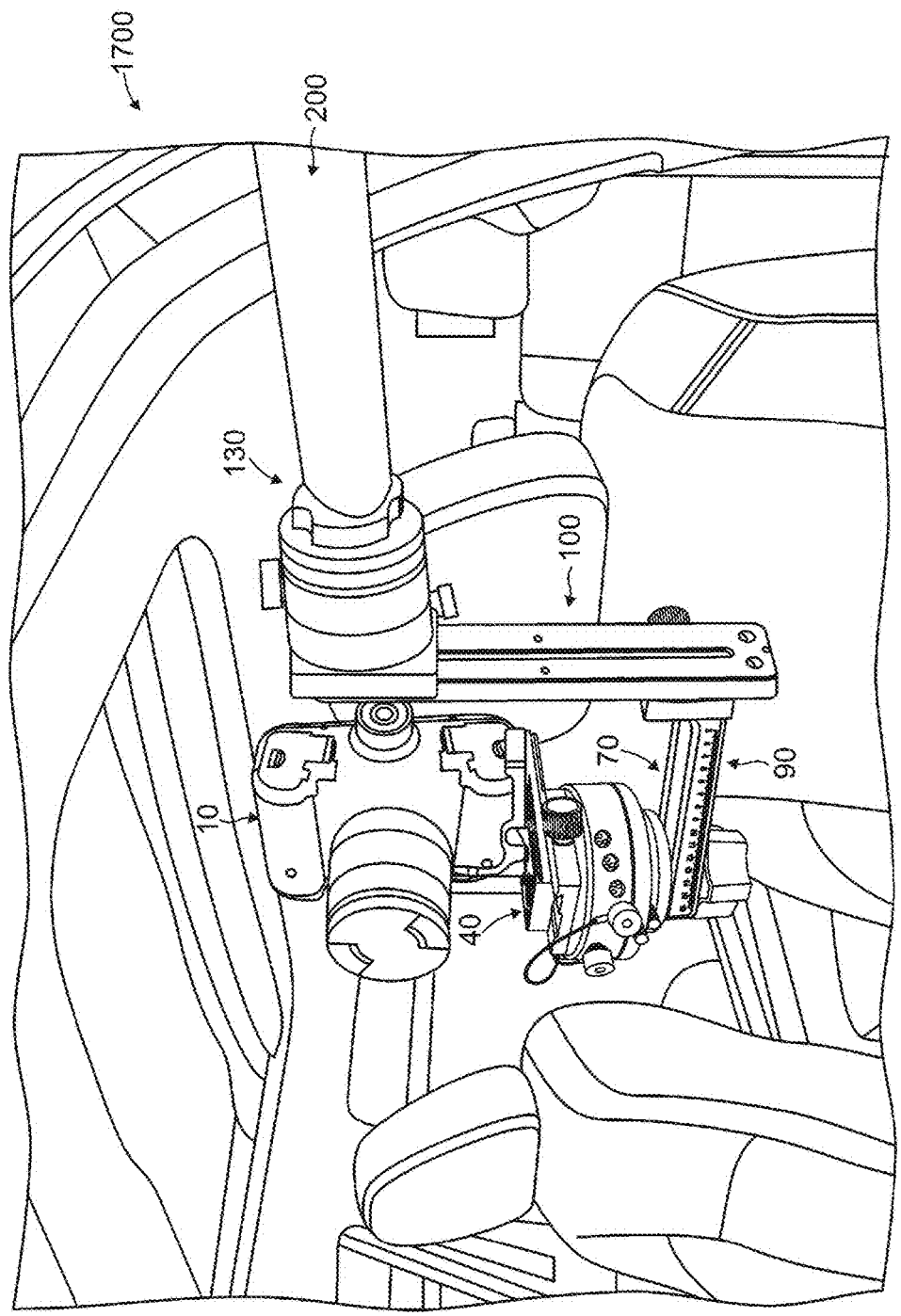
FIG. 4 is a side perspective view of a camera illustrated in FIG. 1 placed into a vehicle from the driver's side with the camera facing the front window and partially illustrating the camera supported by geared column arm.

11. Referring to FIG. 4, place the camera rig 10 through the geared column arm 20 which attaches to the chosen camera support system having a panoramic base 70 into the car through the driver side open window 1700. This placement eliminates the need to rebuild seats, center consoles, etc that comes from placing the tripod inside the vehicle. For reference purposes only, and referring back to FIGS. 1, 2A-2C, the numbered components are the camera rig 10, the "Arca-Swiss" compatible plate with 90 degree clamp 40, the rotating panoramic base with adjustable degree increment 70, the horizontal arm 90 and the vertical "Arca-Swiss" compatible plate 100.

12. Measure that you have placed the camera equidistant to the closest objects, such as steering wheel and driver seat. This is to ensure consistency but also to prevent any separation errors that may occur.

13. Line up the camera so it is level and in the chosen spot, such as directly behind the driver steering wheel, or vehicle center between the two front seats, or in the back seat, etc.

14. Set the camera height to approximate driver eye height.

15. Tilt the steering wheel in order to clearly show the instrument panel gauges.

16. Turn the vehicle into accessory mode and turn the interior accent lighting on.

17. Set the radio to the chosen station or Navigation to the chosen view.

18. Set the camera to the correct settings for exposure, focus, bracketing, color balance, etc.

19. Slide the camera to the left position on the "Arca-Swiss" compatible L-shaped camera mount bracket.

20. From outside of the vehicle, shoot the entire panoramic for the left position.
   a. It has been discovered that the appropriate number of images for a vehicle is typically 18 images for each side. Therefore, there are 18 images taken via the left camera eye.
   b. A nineteenth image is shot by rotating the camera to a lower position so that the exterior apparatus retaining the camera is not shown in that image. Therefore, Image 19 will replace at least one image in the group of eighteen when it is assembled by stitching or other related method into a three-dimensional 360-degree view.

21. Slide the camera to the right position on the "Arca-Swiss" compatible L-shaped camera mount bracket.

22. From outside of the vehicle, shoot the entire panoramic for the right position.
   a. It has been discovered that the appropriate number of images for a vehicle is typically 18 images for each side. Therefore, there are 18 images taken via the right camera eye.
   b. A nineteenth image is shot by rotating the camera to a lower position so that the exterior apparatus retaining the camera is not shown in that image. Therefore, Image 19 will replace at least one image in the group of eighteen when it is assembled by stitching or other related method into a three-dimensional 360-degree view.

24. Turn the vehicle off.

25. Remove the memory card from the camera and upload the images onto the computer.

III. Completion of Photographed Images to be Combined or Stitched Together for Three-Dimensional 360-Degree Panoramic View of the Interior of the Vehicle It has been discovered that the appropriate number of images for a vehicle is typically 18 images for the left side and 18 images for the right side.

Also, the 18 images from the right eye were shot with the camera on the mounting bracket and the 18 additional images from the left eye were then subsequently shot by sliding the same camera over in the left bracket.

The photographs can be of any interior portions of a vehicle. The following set of eighteen (18) photographs are representative of the eighteen (18) shot from a left eye view. Each successive image is rotating the camera by twenty (20) degrees to forty (40) degrees clockwise, with thirty (30) degrees being the preferred clockwise rotation.

1. Front window with driver's side front window trim, driver's side window shade, steering wheel, front dash, front of driver's seat and a portion of the rear view mirror;
2. Front window, driver's side window shade, steering wheel, front dash, front of driver's seat, front of front passenger seat and rear view mirror;
3. Front window, driver's side window shade, steering wheel, front dash, front of driver's seat, front passenger seat and a portion of the front windshield in front of the passenger, a portion of the rear view mirror, the passenger side and driver's side window shades, a portion of the sun roof, and the center console;
4. Front passenger side window, passenger side window shade, front passenger seat;
5. Front passenger side window, passenger side window shade, front passenger seat, rotated driver's seat, sun roof, portions of passenger and driver sunshades, an a portion of the roof illustrating the rear above a passenger seat;
6. Rear passenger side window, a portion of driver's seat, a portion of the passenger seat, the rear of the center console, the sun roof, the passenger side window behind the passenger seat, the rear passenger seat and a portion of the rear roof;
7. Rear passenger side window for the seat behind the driver's seat, rear seats, and driver seat;
8. A portion of the driver's seat, the sun roof, the driver side window and the side window of the passenger seated behind the driver and a portion of the side of the vehicle adjacent the driver;
9. Rear driver's side window, driver window, driver seat, driver's door, and camera system;
10. Driver window, driver seat, driver's door, and camera system;
11. Driver window, driver seat, driver's door, steering wheel, front window, and camera system;
12. Driver window, driver seat, driver's door, steering wheel, front window, and small portion of camera system;
13. Front window in front of driver, driver' sun shade, small portion of sunroof, small portion of steering wheel, small portion of rear view mirror;
14. Front window, Driver visor, driver door ceiling handle, and sunroof
15. Rear driver's side window, driver window, driver seat, rear seats, and sun roof;
16. Driver window, driver seat, driver's door, steering wheel, front window, and gear shifter;
17. Driver seat, driver's door, steering wheel, and gear shifter;

18. Rear driver's side window, rear seats, driver seat, and portion of center console;
19. Extra view with camera support member out of view (one of the photographs includes the camera and the camera support in view which is replaced with the camera out of view. Also illustrated is the front seat, the driver's side window, the driver's side controls and a portion of the driver's side view mirror).

The following set of eighteen (18) photographs are representative of the eighteen (18) shot from a right eye view. Each successive image is rotating the camera by twenty (20) degrees to forty (40) degrees clockwise, with thirty (30) degrees being the preferred clockwise rotation.

1. Front window with driver's side front window trim, driver's side window shade, steering wheel, front dash, front of driver's seat and a portion of the rear view mirror;
2. Front window, driver's side window shade, steering wheel, front dash, front of driver's seat, front of front passenger seat and rear view mirror;
3. Front window, driver's side window shade, steering wheel, front dash, front of driver's seat, front passenger seat and a portion of the front windshield in front of the passenger, a portion of the rear view mirror, the passenger side and driver's side window shades, a portion of the sun roof, and the center console;
4. Front passenger side window, passenger side window shade, front passenger seat;
5. Front passenger side window, passenger side window shade, front passenger seat, rotated driver's seat, sun roof, portions of passenger and driver sunshades, an a portion of the roof illustrating the rear above a passenger seat;
6. Rear passenger side window, a portion of driver's seat, a portion of the passenger seat, the rear of the center console, the sun roof, the passenger side window behind the passenger seat, the rear passenger seat and a portion of the rear roof;
7. Rear passenger side window for the seat behind the driver's seat, rear seats, and driver seat;
8. A portion of the driver's seat, the sun roof, the driver side window and the side window of the passenger seated behind the driver and a portion of the side of the vehicle adjacent the driver;
9. Rear driver's side window, driver window, driver seat, driver's door, and camera system;
10. Driver window, driver seat, driver's door, and camera system;
11. Driver window, driver seat, driver's door, steering wheel, front window, and camera system;
12. Driver window, driver seat, driver's door, steering wheel, front window, and small portion of camera system;
13. Front window in front of driver, driver' sun shade, small portion of sunroof, small portion of steering wheel, small portion of rear view mirror;
14. Front window, Driver visor, driver door ceiling handle, and sunroof
15. Rear driver's side window, driver window, driver seat, rear seats, and sun roof;
16. Driver window, driver seat, driver's door, steering wheel, front window, and gear shifter;
17. Driver seat, driver's door, steering wheel, and gear shifter;
18. Rear driver's side window, rear seats, driver seat, and portion of center console;
19. Extra view with camera support member out of view (one of the photographs includes the camera and the camera support in view which is replaced with the camera out of view. Also illustrated is the front seat, the driver's side window, the driver's side controls and a portion of the driver's side view mirror).

Figure 5:
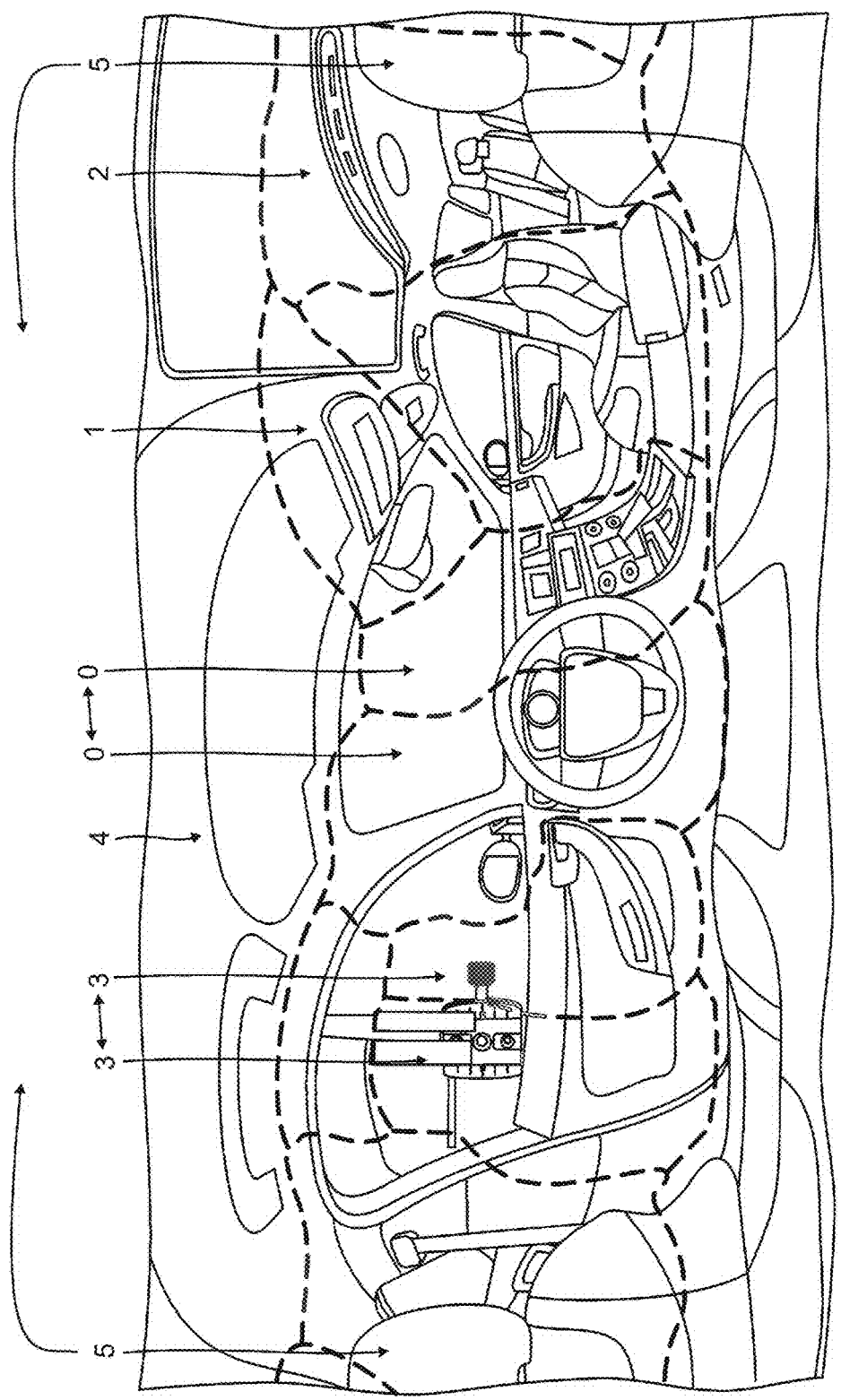
FIG. 5 is a perspective view of the fully assembled 3-dimensional panoramic interior of a vehicle with stitch lines shown, illustrating from left to right in a clockwise direction the driver's seat rotated to expose the camera and the steering wheel, the center console, the passenger seat, the rear seat behind the passenger seat and rear seat behind the driver's seat, also illustrated is the handle on the roof on driver's side, the front window, the rear view mirror, and the driver's side sun visor.

Referring to FIG. 5, there is illustrated one simulation of the stitching lines when the 18 images from the right eye and the 18 images from the left eye are combined through the PTGui program to be described below and also with the stitch lines subsequently eliminated to form the cube as described in FIGS. 6 and 7 below. The stitch lines illustrated in FIG. 5 are merely intended to be representative of a combined stitch line which is used in the PTGui program as modified below with the stitch lines in particular emphasized at step 4080 below. Referring to the flow charts, FIGS. 8-11 show the entire flow chart from the first step to the last step in using the computer program to finalize the visual image.

Stitch line 0 is a portion of the steering wheel, the front windshield, a portion of the driver's window, the console and the instrument panel. Stitch line number 1 contains the passenger seat, the passenger door, the center console, the passenger window, a portion of the front windshield and a portion of the passenger rear seat window. Stitch line number 2 contains rear seats, the rear window, and the rear of the interior of the car. Stitch line number 3 contains the driver door, the driver window and a portion of the driver seat. Stitch line number 4 contains the roof or the top of the vehicle. Stitch line number 5 is the driver seat which is incorporated into a broken area where stitch line number 5 is illustrated in portions on the left side as number 5 and also the remaining portion of the driver seat illustrated in stitch line 5 illustrated on the right side because the images are combined. Where the stitch lines are incorporated into two numbers, the numbers 3 and 0 have been matched to show matching stitch lines.

Figure 6:
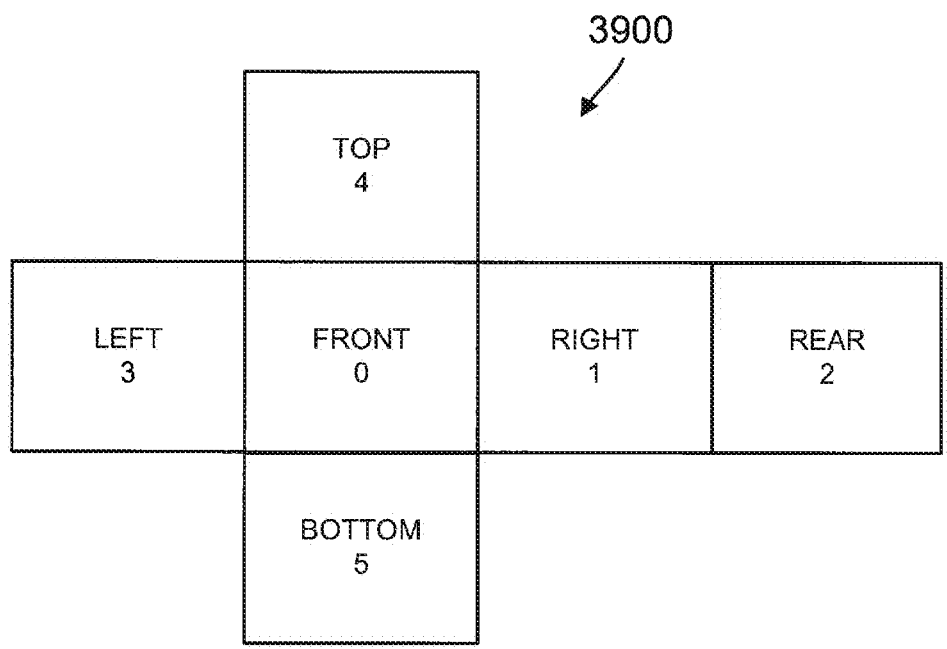
FIG. 6 is an illustration of the six images which are created to form a cube which are taken from the finalized images illustrated in FIG. 5 where the stitch lines have been removed and the views assembled to create the six images which will be used for the final post production creation of the virtual image of the vehicle interior.
Figure 7:
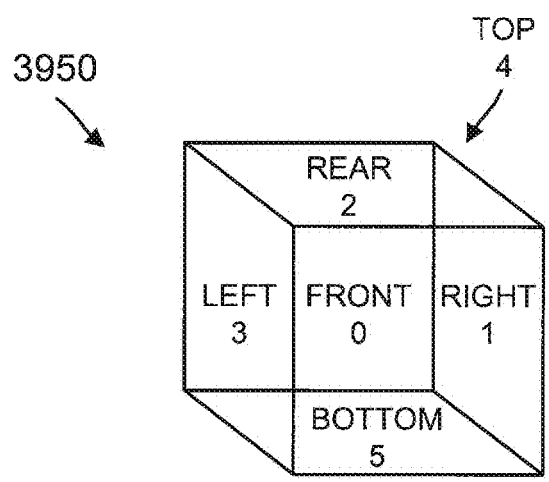
FIG. 7 is a perspective view of the formed cube taken from FIG. 6.
Figure 8:
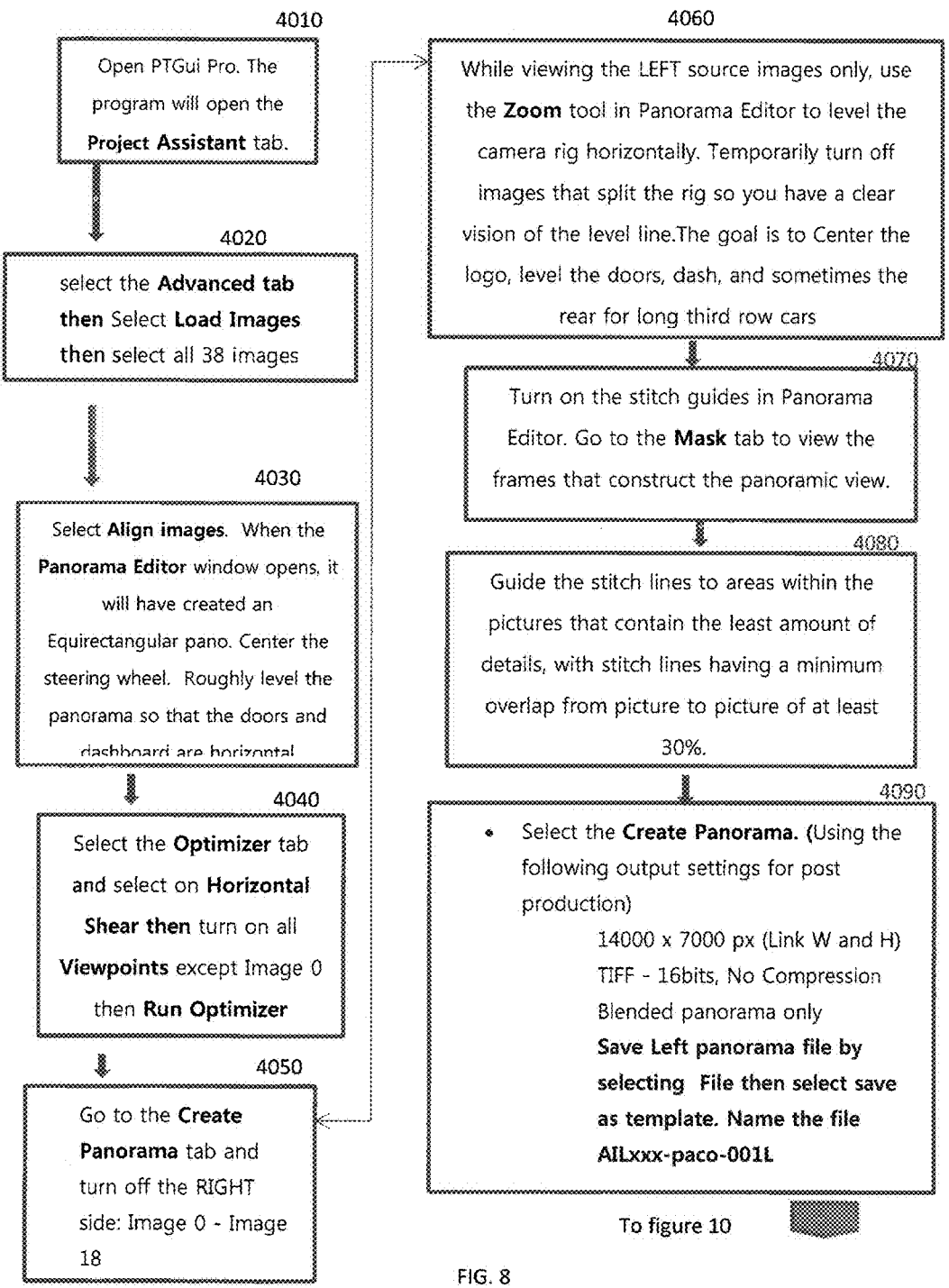
FIG. 8 is a first of four sheets illustrating a flow chart with steps 4010-4090 for the creation of the three-dimensional panoramic virtual image of the automotive interior starting with the 18 images viewed from the left eye and incorporating the 18 images viewed from the right eye to create a final visual image of the vehicle interior placed onto the six faces of the cube illustrated in previous FIG. 7.

Referring to FIGS. 6 and 7, when the images are completed, the images essentially form a cube. The cube contains six images numbered 0, 1, 2, 3, 4, and 5. These images which are displayed in a vertical orientation (3900) in FIG. 6 with image 0 on the front side, image 1 on the right side, image 2 on the rear side, image 3 is on the left side, image 4 is on the top side and image 5 on the bottom side. The front image of the cube numbered 0 is the steering wheel, the front windshield, a portion of the driver's window, the center console, and the instrument panel. The right side of the cube numbered 1 contains the passenger seat, the passenger door, the center console, the passenger window, a portion of the front windshield, and a portion of the passenger rear window. The rear side of the cube numbered 2 contains the rear seats, the rear window, and the rear of the interior of the car. The left side of the cube numbered 3 contains the driver door, the driver window, and a portion of the driver's seat. Image number 4 is the top of the roof of the car. The bottom of the cube numbered 5 contains an image of the driver's seat.

These images fold together as shown in FIG. 7 to form cube (3950). Illustrated in FIG. 7 is image 0 on the front side, image 1 on the right side, image 2 on the rear side, image 3 on the left side, image 4 on the top side, and image 5 on the bottom side collectively coming together to form cube (3950). Cube (3950) is then ready for viewing.

After the photography has been completed, there are a selected number of images of all locations in the vehicle to be able to be utilized for the purpose of combining the images into a final three-dimensional 360 degree product. The following paragraphs describe in detail the steps to create an automotive interior panoramic photographic image using program software applications PTGui pro, Adobe Photoshop, and Adobe Bridge.

Referring to the software flowchart in FIGS. 8-11,

Open PTGui Pro. The program will open the Project Assistant tab (4010).

Select the Advanced tab then Select Load Images then select all 38 images (4020).

Select Align images. When the Panorama Editor window opens, it will have created an Equirectangular pano. Center the steering wheel. Roughly level the panorama so that the doors and dashboard are horizontal (4030).

Select the Optimizer tab and click on Horizontal. Shear then turn on all Viewpoints except Image 0 then Run Optimizer (4040).

Go to the Create Panorama tab and turn off the RIGHT side: Image 0-Image 18 (4050). While viewing the LEFT source images only, use the Zoom tool in Panorama Editor to level the camera rig horizontally. Temporarily turn off images that split the rig so you have a clear vision of the level line. The goal is to Center the logo, level the doors, dash, and sometimes the rear for long third row cars (4060).

Turn on the stitch guides in Panorama Editor. Go to the Mask tab to view the frames that construct the panoramic view (4070).

Guide the stitch lines to areas within the pictures that contain the least amount of details, with stitch lines having a minimum overlap from picture to picture of at least 30% (4080).

Included in Step 4080, referring to FIG. 5, this figure illustrates the camera images being opened in the panorama editor within program PTGui. The images in FIG. 5 illustrate, (moving from left to right in FIG. 5) a driver seat 3020, a driver door 3030, a steering wheel 3040, a center console 3050, a passenger seat 3060, a passenger door 3070, and back seat area including rear seats 3080. Further referring to FIG. 5, dashed stitch lines 3100 are used to combine and transition from the individual images captured using the camera to one seamless panoramic image.

Select the Create Panorama. (Using the following output settings for post production)

14000×7000 px (Link W and H)

TIFF—16 bits, No Compression

Blended panorama only

Save Left panorama file by selecting File then select save as template. Name the file AILxxx-paco-001L (4090).

Figure 9:
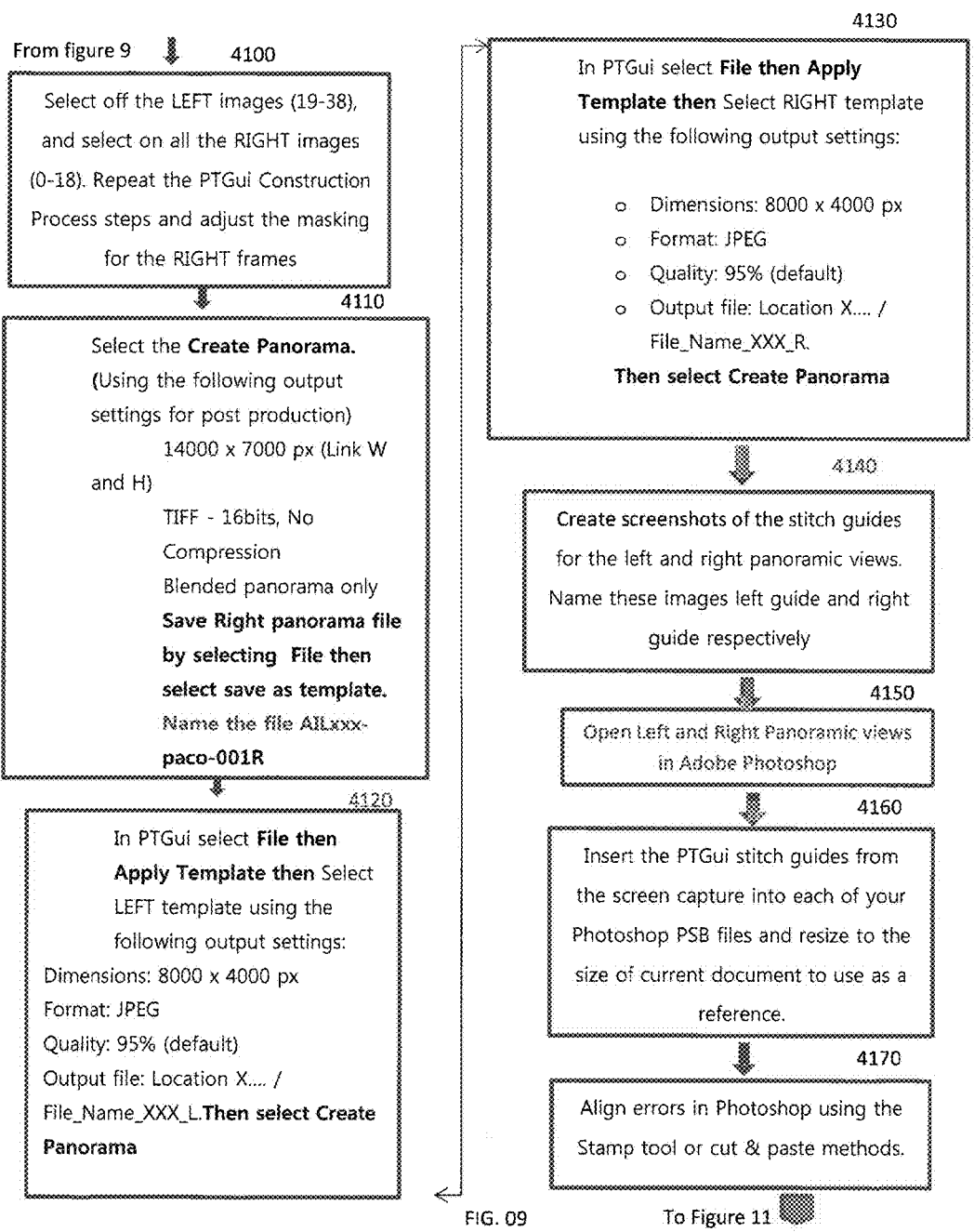
FIG. 9 is a continuation of FIG. 8 further illustrating a flow chart with steps 4100-4170 for the creation of the three-dimensional panoramic virtual image of the automotive interior starting with the 18 images viewed from the left eye and incorporating the 18 images viewed from the right eye to create a final visual image of the vehicle interior.
Figure 10:
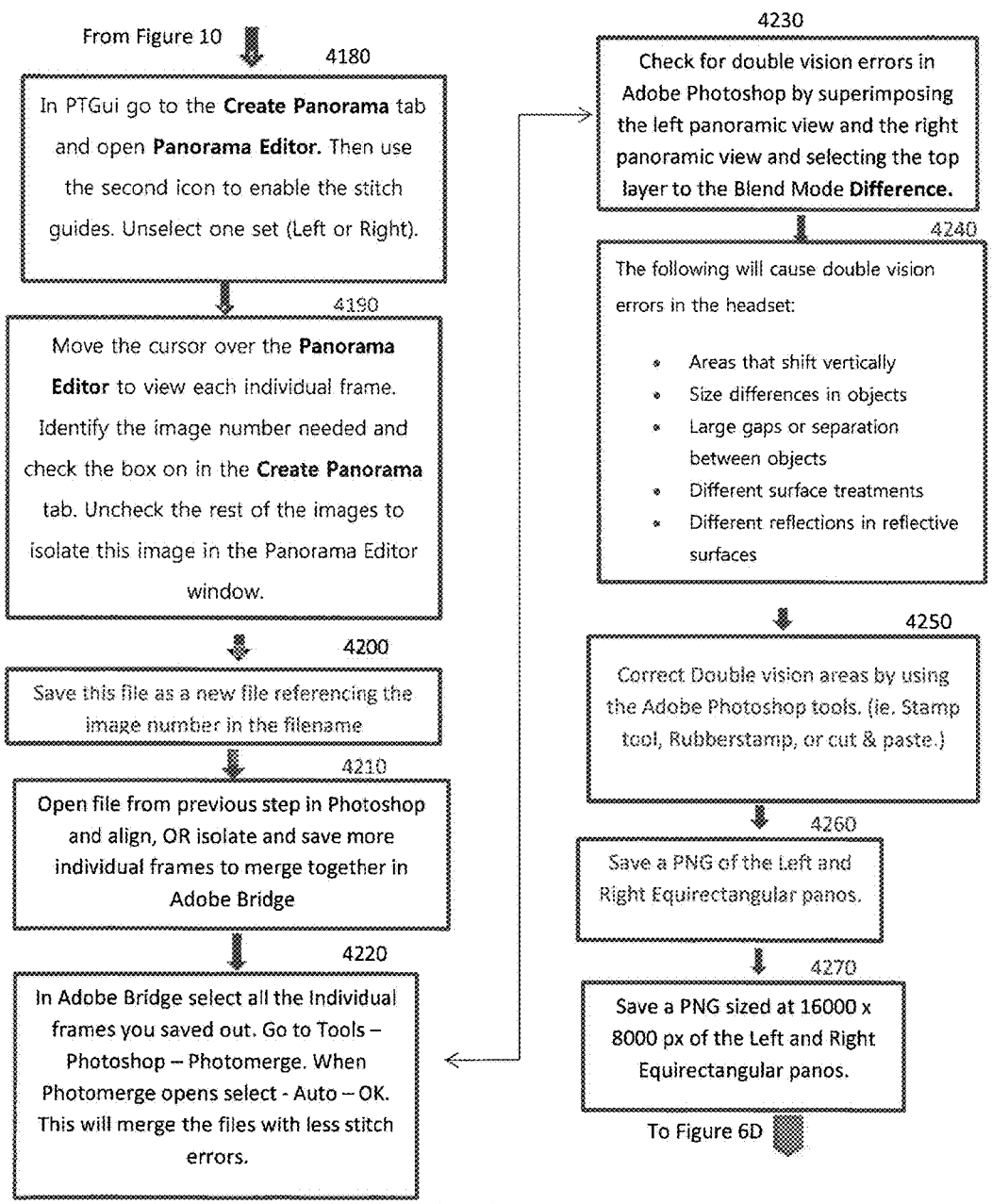
FIG. 10 is a continuation of FIG. 9 further illustrating a flow chart with steps 4180-4260 for the creation of the three-dimensional panoramic virtual image of the automotive interior starting with the 18 images viewed from the left eye and incorporating the 18 images viewed from the right eye to create a final visual image of the vehicle interior.
Figure 11:
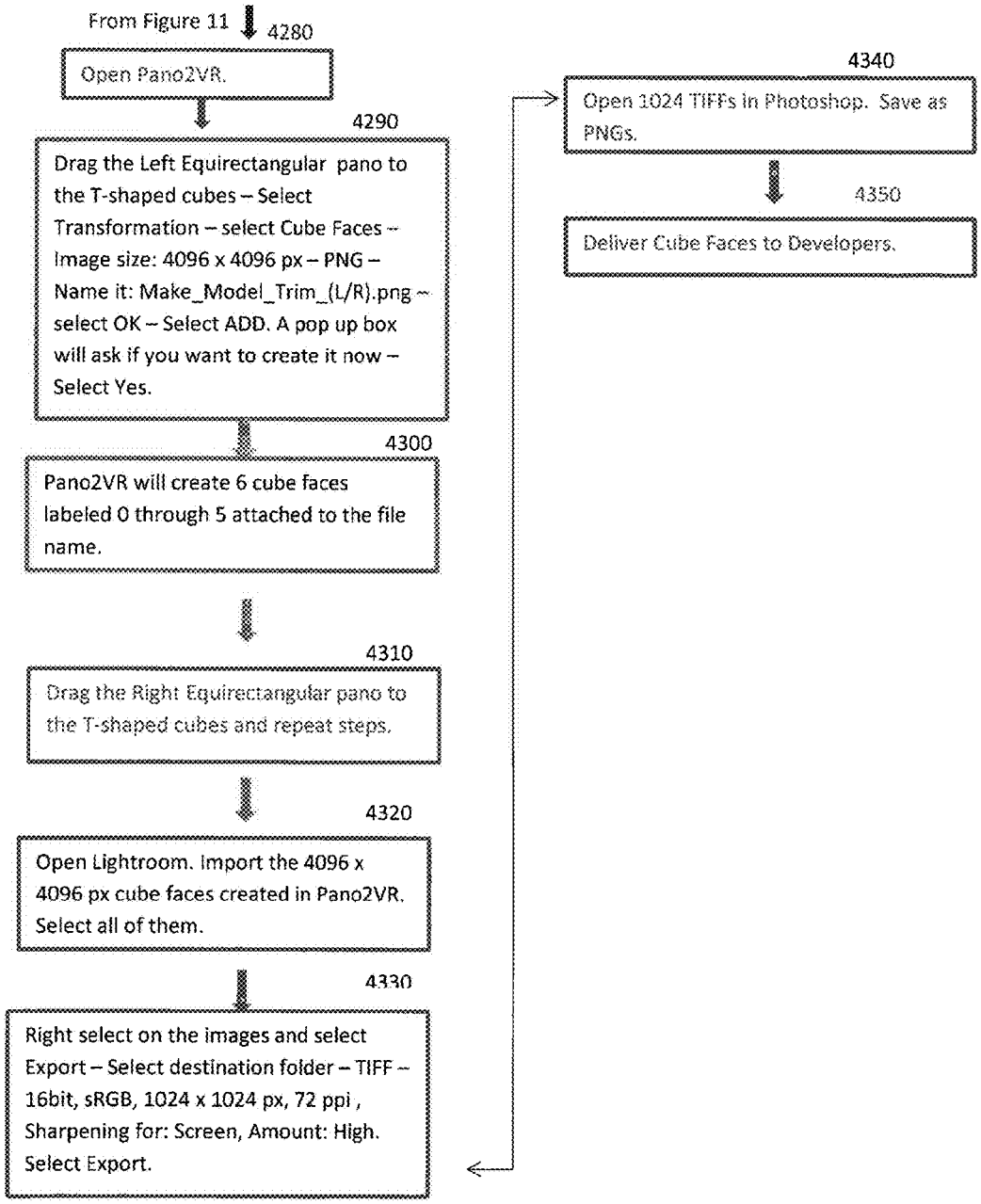
FIG. 11 is the last of the four sheets and a continuation of FIG. 10 further illustrating a flow chart with steps 4270-4350 for the creation of the three-dimensional panoramic virtual image of the automotive interior starting with the 18 images viewed from the left eye and incorporating the 18 images viewed from the right eye to create a final visual image of the vehicle interior.

Referring to combination chart FIG. 9,

Click off the LEFT images (19-38), and click on all the RIGHT images (0-18). Repeat the PTGui Construction Process steps and adjust the masking for the RIGHT frames (4100).

Select the Create Panorama. (Using the following output settings for post production)

14000×7000 px (Link W and H)

TIFF—16 bits, No Compression

Blended panorama only

Save Right panorama file by selecting File then select save as template. Name the file AILxxx-paco-001R (4110).

In PTGui select File then Apply Template then Select LEFT template using the following output settings:

Dimensions: 8000×4000 px

Format: JPEG

Quality: 95% (default)

Output file: Location X . . . /File_Name_XXX_L.

Then select Create Panorama (4120).

In PTGui select File then Apply Template then Select RIGHT template using the following output settings:

Dimensions: 8000×4000 px

Format: JPEG

Quality: 95% (default)

Output file: Location X . . . /File_Name_XXX_R.

Then select Create Panorama (4130).

Create screenshots of the stitch guides for the left and right panoramic views. Name these images left guide and right guide respectively (4140).

Open Left and Right Panoramic views in Adobe Photoshop (4150).

Insert the PTGui stitch guides from the screen capture into each of your Photoshop PSB files and resize to the size of current document to use as a reference (4160).

Align errors in Photoshop using the Stamp tool or cut & paste methods (4170).

In PTGui go to the Create Panorama tab and open Panorama Editor. Then use the second icon to enable the stitch guides. Unselect one set (Left or Right) (4180).

Move the cursor over the Panorama Editor to view each individual frame. Identify the image number needed and check the box on in the Create Panorama tab. Uncheck the rest of the images to isolate this image in the Panorama Editor window (4190).

Save this file as a new file referencing the image number in the filename (4200).

Open file from previous step in Photoshop and align, OR isolate and save more individual frames to merge together in Adobe Bridge (4210).

In Adobe Bridge select all the Individual frames you saved out. Go to Tools—Photoshop—Photomerge. When Photomerge opens select—Auto—OK. This will merge the files with less stitch errors (4220).

Check for double vision errors in Adobe Photoshop by superimposing the left panoramic view and the right panoramic view and selecting the top layer to the Blend Mode Difference (4230).

The following will cause double vision errors in the headset: Areas that shift vertically Size differences in objects Large gaps or separation between objects Different surface treatments different reflections in reflective surfaces (4240).

Correct Double vision areas by using the Adobe Photoshop tools. (i.e. Stamp tool, Rubberstamp, or cut & paste) (4250).

Save a PNG of the Left and Right Equirectangular panos (4260).

Save a PNG sized at 16000×8000 px of the Left and Right Equirectangular panos (4270).

Open Pano2VR (4280).

Drag the Left Equirectangular pano to the T-shaped cubes— Select Transformation—select Cube Faces—Image size: 4096×4096 px—PNG—Name it: Make_Model_Trim_(L/R) .png—select OK—Select ADD. A pop up box will ask if you want to create it now—Select Yes (4290).

Pano2VR will create 6 cube faces labeled 0 through 5 attached to the file name (4300).

Drag the Right Equirectangular pano to the T-shaped cubes and repeat steps (4310).

Open Lightroom. Import the 4096×4096 px cube faces created in Pano2VR. Select all of them (4320).

Right select on the images and select Export—Select destination folder—TIFF—16 bit, sRGB, 1024×1024 px, 72 ppi, Sharpening for: Screen, Amount: High. Select Export (4330).

Open 1024 TIFFs in Photoshop. Save as PNGs (4340).

Deliver Cube Faces to Developers (4350).

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A method for creating a stereoscopic panoramic image of an interior of a vehicle having a driver's side window, a steering wheel, a driver's seat including a cushion and back seat, a driver's side of the vehicle, a driver's side rear window, a front passenger window, a rear passenger side window, at least a pair of backseats including a top portion of each respective backseat, a pair of front seats including a driver's seat and a passenger seat having a top portion, comprising:
   a. placing a vehicle on a ground having a horizontal surface in an enclosure having at least 10 feet clearance on all sides of the vehicle and above the vehicle;
   b. utilizing an assembled single camera stereo panoramic rig including a 35 mm single lens reflex camera having a full frame sensor, a remote trigger mechanism, an L-shaped camera mount bracket, a clamp enabling the camera to slide left and right on a horizontal arm of the L-shaped bracket, the L-shaped bracket including a vertical portion connected to a rotating panoramic base with adjustable increments which in turn is connected to a camera support assembly, a retaining member placed exterior to the driver side of the vehicle and placing the assembled single camera stereo panoramic rig into the vehicle through an open driver side window and placing the camera and a remote trigger mechanism, the L-shaped camera mount bracket, the clamp enabling the camera to slide left and right on a horizontal arm of the L-shaped bracket, the L-shaped bracket including the vertical portion connected to a rotating panoramic base with adjustable increments positioned between the steering wheel and a backseat portion of the driver's seat;
   c. lighting the vehicle through placement of a first 1000 kilowatt lamp exterior to the vehicle and at approximately three feet from the driver side of the vehicle and approximately seven feet above the ground at approximately a 45 degree angle relative to the driver side of the vehicle, placing a second 1000 kilowatt lamp exterior to the vehicle and at approximately three fee from the driver side rear window of the vehicle and approximately seven feet above the ground at approximately a 45 degree angle relative to the driver side rear window, placing a third 1000 kilowatt lamp exterior to the vehicle and at approximately three feet from the front passenger window of the vehicle and approximately seven feet above the ground and at approximately a 45 degree angle relative to the front passenger window, placing a fourth 1000 kilowatt lamp exterior to the vehicle and at approximately three feet from the rear passenger side window and approximately seven feet above the ground at approximately a 45 degree angle relative to the rear passenger side window of the vehicle, placing a first 300 watt lamp exterior to the vehicle at approximately three feet from the rear of the vehicle and approximately seven feet above the ground with the lamp aimed at a center of the top of the backseat of the vehicle, placing a second 300 watt lamp exterior to the vehicle and approximately three feet from a front of the vehicle and approximately seven feet above the ground with the lamp aimed at the center of the tops of the front seats of the vehicle;
   d. activating the camera through the remote activation member to photograph 18 images of the vehicle when viewed from a left eye of a person with each successive image created by rotating the camera of the single camera stereo panoramic rig to create selected images of the interior of the vehicle, the images including:
      i. front window with driver's side front window trim, driver's side window shade, steering wheel, front dash, front of driver's seat and a portion of the rear view mirror,
      ii. front window, driver's side window shade, steering wheel, front dash, front of driver's seat, front of front passenger seat and rear view mirror,
      iii. front window, driver's side window shade, steering wheel, front dash, front of driver's seat, front passenger seat and a portion of the front windshield in front of the passenger, a portion of the rear view mirror, the passenger side and driver's side window shades, a portion of the sun roof, and the center console,
      iv. front passenger side window, passenger side window shade, front passenger seat,
      v. front passenger side window, passenger side window shade, front passenger seat, rotated driver's seat, sun roof, portions of passenger and driver sunshades, and a portion of the roof above a passenger seat,
      vi. rear passenger side window, a portion of the driver's seat, a portion of the passenger seat, the rear of the center console, the sun roof, the passenger side window behind the passenger seat, the rear passenger seat and a portion of the rear roof,
      vii. rear passenger side window for the seat behind the driver's seat, rear seats, and driver seat,
      viii. a portion of the driver's seat, the sun roof, the driver side window and the side window of the passenger seated behind the driver and a portion of the side of the vehicle adjacent the driver,
      ix. rear driver's side window, driver window, driver seat, driver's door, and camera system,
      x. driver window, driver seat, driver's door, and camera system,
      xi. driver window, driver seat, driver's door steering wheel, front window, and camera system, Driver window, driver seat, driver's door, steering wheel, front window, and small portion of camera system,
      xii. front window in front of driver, driver' sun shade, small portion of sunroof, small portion of steering wheel, small portion of rear view mirror,
      xiii. front window, Driver visor, driver door ceiling handle, and sunroof
      xiv. rear driver's side window, driver window, driver seat, rear seats, and sun roof,
      xvi. driver window, driver seat, driver's door, steering wheel, front window, and gear shifter,
      xvii. driver seat, driver's door, steering wheel, and gear shifter,
      xviii. rear driver's side window, rear seats, driver seat, and portion of center console,
      xix. extra view with camera support member out of view;
   e. sliding said camera of said rig to photograph a second series of 18 photographs of the vehicle viewed from an imaginary right eye of a viewer, the images including:

i. front window with driver's side front window trim, driver's side window shade, steering wheel, front dash, front of driver's seat and a portion of the rear view mirror,
ii. front window, driver's side window shade, steering wheel, front dash, front of driver's seat, front of front passenger seat and rear view mirror,
iii. front window, driver's side window shade, steering wheel, front dash, front of driver's seat, front passenger seat and a portion of the front windshield in front of the passenger, a portion of the rear view mirror, the passenger side and driver's side window shades, a portion of the sun roof, and the center console,
iv. front passenger side window, passenger side window shade, front passenger seat,
v. front passenger side window, passenger side window shade, front passenger seat, rotated driver's seat, sun roof, portions of passenger and driver sunshades, and a portion of the roof above a passenger seat,
vi. rear passenger side window, a portion of the driver's seat, a portion of the passenger seat, the rear of the center console, the sun roof, the passenger side window behind the passenger seat, the rear passenger seat and a portion of the rear roof,
vii. rear passenger side window for the seat behind the driver's seat, rear seats, and driver seat,
viii. a portion of the driver's seat, the sun roof, the driver side window and the side window of the passenger seated behind the driver and a portion of the side of the vehicle adjacent the driver,
ix. rear driver's side window, driver window, driver seat, driver's door, and camera system,
x. driver window, driver seat, driver's door, and camera system,
xi. driver window, driver seat, driver's door steering wheel, front window, and camera system, Driver window, driver seat, driver's door, steering wheel, front window, and small portion of camera system,
xii. front window in front of driver, driver' sun shade, small portion of sunroof, small portion of steering wheel, small portion of rear view mirror,
xiii. front window, Driver visor, driver door ceiling handle, and sunroof
xiv. rear driver's side window, driver window, driver seat, rear seats, and sun roof,
xvi. driver window, driver seat, driver's door, steering wheel, front window, and gear shifter,
xvii. driver seat, driver's door, steering wheel, and gear shifter,
xviii. rear driver's side window, rear seats, driver seat, and portion of center console,
xix. extra view with camera support member out of view;
f. activating and utilizing a PTGui software program to assemble the 18 images taken from the left eye and the 18 images taken from the right eye into an overlap combined stitched panoramic view of the interior of the vehicle and causing the stitched line to be removed to create an entire image of the interior of the vehicle; and
g. incorporating the images of the interior of the vehicle to create a cube with six faces, the six faces being a front image of the cube numbered 0 including a steering wheel, a front windshield, a portion of the driver's window, a center console, and an instrument panel, a right side of the cube numbered 1 containing images of a passenger seat, a passenger door, the center console, the passenger window, a portion of a front windshield, and a portion of the passenger rear window, the rear side of the cube numbered 2 containing images of the rear seats, a rear window, and a rear of the interior of the vehicle, a left side of the cube numbered 3 containing images of a driver door, the driver window, and a portion of the driver's seat, the top of the cube numbered 4 containing images of the roof of the vehicle, and the image number 5 being the bottom of the cube containing images of the driver's seat.

2. The method for creating a stereoscopic panoramic image of an interior of a vehicle in accordance with claim 1, activating and utilizing a PTGui software program further comprising the steps of:
a. open PTGui Pro then select the advanced tab then Select Load Images then select all 36 images;
b. select Align images and center the steering wheel within the panorama while making the doors and dashboard horizontal;
c. select the Optimizer tab and click on Horizontal;
d. turn on all Viewpoints except Image 0 then Run Optimizer;
e. go to the Create Panorama tab and turn off the RIGHT side: Image 0-Image 18;
f. while viewing the LEFT source images only, use the Zoom tool in Panorama Editor to level the camera rig horizontally, then, Center the logo, level the doors, dash, and rear;
g. turn on the stitch guides in Panorama Editor, go to the Mask tab to view the frames that construct the panoramic view;
h. guide the stitch lines to areas within the pictures that contain the least amount of details, with stitch lines having a minimum overlap from picture to picture of at least 30%;
i. save the left panorama with output settings: 14000× 7000 px (Link W and H); TIFF—16 bits, No Compression; and blended panorama only;
j. deselect the LEFT images (19-38), and select on all the RIGHT images (0-18); Repeat the PTGui Construction Process steps while adjusting the masking for the RIGHT frames;
k. save the right panorama with output settings: 14000× 7000 px (Link W and H); TIFF—16 bits, no compression; and blended panorama only;
l. using PTGui select File then Apply Template then Select LEFT template using the following output settings, Dimensions: 8000×4000 px; Format, JPEG, Quality: 95%;
m. then select Create Panorama;
n. using PTGui select File then Apply Template then Select RIGHT template using the following output settings: Dimensions: 8000×4000 px; Format: JPEG; Quality: 95%; then select Create Panorama;
o. create screenshots of the stitch guides for the left and right panoramic views; Name these images left guide and right guide respectively;
p. open Left and Right Panoramic views in Adobe Photoshop;
q. insert the PTGui stitch guides from the screen capture into each of the photoshop PSB files and resize to the size of current document to use as a reference;
r. align errors in Photoshop using the Stamp tool;
s. in PTGui go to the Create Panorama tab and open Panorama Editor, then use the second icon to enable the stitch guides and unselect one set (Left or Right);

t. move the cursor over the Panorama Editor to view each individual frame, identify the image number needed and check the box on in the Create Panorama tab, uncheck the rest of the images to isolate this image in the Panorama Editor window;

u. save this file as a new file referencing the image number in the filename;

v. open file from previous step in Photoshop and align, OR isolate and save more individual frames to merge together in Adobe Bridge;

w. using Adobe Bridge select all the Individual frames save; then select Photomerge, then select auto then select OK;

x. check for double vision errors in Adobe Photoshop by superimposing the left panoramic view and the right panoramic view and selecting the top layer to the Blend Mode Difference;

y. correct double vision areas by using the Adobe Photoshop tools Stamp tool;

z. save the Left and Right Equirectangular panoramic views;

aa. open Pano2VR;

bb. drag the Left Equirectangular panoramic view to the T-shaped cubes; then select Transformation; then select Cube Faces with Image size, 4096×4096, then Name and save;

cc. drag the Right Equirectangular panoramic view to the T-shaped cubes then select Transformation; then select Cube Faces with Image size: 4096×4096; then Name and save; and dd. open Lightroom then Import the 4096×4096 px cube faces created in Pano2VR, select all of them.

3. A method for creating a stereoscopic panoramic image of an interior of a vehicle having a driver's side window, a steering wheel, a driver's seat including a cushion and back seat, a driver's side of the vehicle, a driver's side rear window, a front passenger window, a rear passenger side window, at least a pair of backseats including a top portion of each respective backseat, a pair of front seats including a driver's seat and a passenger seat having a top portion, comprising:

a. placing a vehicle on a ground having a horizontal surface in an enclosure having at least 10 feet clearance on all sides of the vehicle and above the vehicle;

b. utilizing an assembled single camera stereo panoramic rig including a 35 mm single lens reflex camera having a full frame sensor, a remote trigger mechanism, an L-shaped camera mount bracket, a clamp enabling the camera to slide left and right on a horizontal arm of the L-shaped bracket, the L-shaped bracket including a vertical portion connected to a rotating panoramic base with adjustable increments which in turn is connected to a camera support assembly, a retaining member placed exterior to the driver side of the vehicle and placing the assembled single camera stereo panoramic rig into the vehicle through an open driver side window and placing the camera and a remote trigger mechanism, the L-shaped camera mount bracket, the clamp enabling the camera to slide left and right on a horizontal arm of the L-shaped bracket, the L-shaped bracket including the vertical portion connected to a rotating panoramic base with adjustable increments positioned between the steering wheel and a backseat portion of the driver's seat;

c. lighting the vehicle through placement of a first 1000 kilowatt lamp exterior to the vehicle and at approximately three feet from the driver side of the vehicle and approximately seven feet above the ground at approximately a 45 degree angle relative to the driver side of the vehicle, placing a second 1000 kilowatt lamp exterior to the vehicle and at approximately three fee from the driver side rear window of the vehicle and approximately seven feet above the ground at approximately a 45 degree angle relative to the driver side rear window, placing a third 1000 kilowatt lamp exterior to the vehicle and at approximately three feet from the front passenger window of the vehicle and approximately seven feet above the ground and at approximately a 45 degree angle relative to the front passenger window, placing a fourth 1000 kilowatt lamp exterior to the vehicle and at approximately three feet from the rear passenger side window and approximately seven feet above the ground at approximately a 45 degree angle relative to the rear passenger side window of the vehicle, placing a first 300 watt lamp exterior to the vehicle at approximately three feet from the rear of the vehicle and approximately seven feet above the ground with the lamp aimed at a center of the top of the backseat of the vehicle, placing a second 300 watt lamp exterior to the vehicle and approximately three feet from a front of the vehicle and approximately seven feet above the ground with the lamp aimed at the center of the tops of the front seats of the vehicle;

d. activating the camera to photograph 18 images of the vehicle when viewed from a left eye of a person with each successive image created by rotating the camera of the single camera stereo panoramic rig to create selected images of the interior of the vehicle, and sliding the camera of said rig to photograph a second series of 18 photographs of the vehicle viewed from a right eye of a person;

e. activating and utilizing a PTGui software program to assemble the 18 images taken from the left eye and the 18 images taken from the right eye into an overlap combined stitched panoramic view of the interior of the vehicle and causing the stitched line to be removed to create an entire image of the interior of the vehicle; and f. incorporating the images of the interior of the vehicle to create a cube with six faces, the six faces being a front image of the cube numbered 0 including a steering wheel, a front windshield, a portion of the driver's window, a center console, and an instrument panel, a right side of the cube numbered 1 containing images of a passenger seat, a passenger door, a center console, a passenger window, a portion of a front windshield, and a portion of the passenger rear window, a rear side of the cube numbered 2 containing images of rear seats inside the vehicle, a rear window, and a rear of the interior of the vehicle, a left side of the cube numbered 3 containing images of a driver door, a driver window, and a portion of a driver's seat, the top of the cube numbered 4 containing images of a roof of the vehicle, and the image number 5 being the bottom of the cube containing images of the driver's seat.

4. A method for creating a stereoscopic panoramic image of an interior of a vehicle comprising:

a. utilizing an assembled single camera stereo panoramic rig including a single lens camera having a full frame sensor, a remote trigger mechanism, an L-shaped camera mount bracket, a clamp enabling the camera to slide left and right on a horizontal arm of the L-shaped bracket, the L-shaped bracket including a vertical portion connected to a rotating panoramic base with adjustable increments which in turn is connected to a camera support assembly, a retaining member placed exterior to a driver side of the vehicle and placing the assembled single camera stereo panoramic rig into the vehicle through an open driver side window and placing the camera and a remote trigger mechanism, the L-shaped camera mount bracket, the clamp enabling the camera to slide left and right on a horizontal arm of the L-shaped bracket;

b. the L-shaped bracket including the vertical portion connected to a rotating panoramic base with adjustable increments positioned between the steering wheel and a backseat portion of the driver's seat;

c. with the single lens camera on the left side of the horizontal arm of the L-shaped camera, photographing 18 panoramic images of an entire interior of the vehicle and with the camera slid to the right side of the horizontal arm of the L-shaped bracket, taking 18 panoramic photographs of the interior of the vehicle as viewed from a right eye of a viewer;

d. combining the 18 panoramic photographs taken from the left side of a viewer and the 18 panoramic photographs taken from the right side of the viewer to receive one set of 18 panoramic images of the interior of the vehicle with any overlapped images combined to have one seamless panoramic view of the interior of the vehicle;

e. lighting the vehicle through placement of a first 1000 kilowatt lamp exterior to the vehicle and at approximately three feet from the driver side of the vehicle and approximately seven feet above the ground at approximately a 45 degree angle relative to the driver side of the vehicle, placing a second 1000 kilowatt lamp exterior to the vehicle and at approximately three fee from the driver side rear window of the vehicle and approximately seven feet above the ground at approximately a 45 degree angle relative to the driver side rear window, placing a third 1000 kilowatt lamp exterior to the vehicle and at approximately three feet from the front passenger window of the vehicle and approximately seven feet above the ground and at approximately a 45 degree angle relative to the front passenger window, placing a fourth 1000 kilowatt lamp exterior to the vehicle and at approximately three feet from the rear passenger side window and approximately seven feet above the ground at approximately a 45 degree angle relative to the rear passenger side window of the vehicle, placing a first 300 watt lamp exterior to the vehicle at approximately three feet from the rear of the vehicle and approximately seven feet above the ground with the lamp aimed at a center of the top of the backseat of the vehicle, placing a second 300 watt lamp exterior to the vehicle and approximately three feet from a front of the vehicle and approximately seven feet above the ground with the lamp aimed at the center of the tops of the front seats of the vehicle; and f. utilizing a PTGui software program, further comprising the steps of:

a. open PTGui Pro then select the advanced tab then Select Load Images then select all 38 images;

b. select Align images and center the steering wheel within the panorama while making the doors and dashboard horizontal;

c. select the Optimizer tab and click on Horizontal;

d. turn on all Viewpoints except Image 0 then Run Optimizer;

e. go to the Create Panorama tab and turn off the RIGHT side: Image 0-Image 18;

f. while viewing the LEFT source images only, use the Zoom tool in Panorama Editor to level the camera rig horizontally, then, Center the logo, level the doors, dash, and rear;

g. turn on the stitch guides in Panorama Editor, go to the Mask tab to view the frames that construct the panoramic view;

h. guide the stitch lines to areas within the pictures that contain the least amount of details, with stitch lines having a minimum overlap from picture to picture of at least 30%;

i. save the left panorama with output settings: 14000× 7000 px (Link W and H); TIFF—16 bits, No Compression; and blended panorama only;

j. deselect the LEFT images (19-38), and select on all the RIGHT images (0-18); Repeat the PTGui Construction Process steps while adjusting the masking for the RIGHT frames;

k. save the right panorama with output settings: 14000× 7000 px (Link W and H); TIFF—16 bits, no compression; and blended panorama only;

l. using PTGui select File then Apply Template then Select LEFT template using the following output settings, Dimensions: 8000×4000 px; Format, JPEG, Quality: 95%;

m. then select Create Panorama;

n. using PTGui select File then Apply Template then Select RIGHT template using the following output settings: Dimensions: 8000×4000 px; Format: JPEG; Quality: 95%; then select Create Panorama;

o. create screenshots of the stitch guides for the left and right panoramic view; Name these images left guide and right guide respectively;

p. open Left and Right Panoramic views in Adobe Photoshop;

q. insert the PTGui stitch guides from the screen capture into each of the photoshop PSB files and resize to the size of current document to use as a reference;

r. align errors in Photoshop using the Stamp tool;

s. in PTGui go to the Create Panorama tab and open Panorama Editor, then use the second icon to enable the stitch guides and unselect one set (Left or Right);

t. move the cursor over the Panorama Editor to view each individual frame, identify the image number needed and check the box on in the Create Panorama tab, uncheck the rest of the images to isolate this image in the Panorama Editor window;

u. save this file as a new file referencing the image number in the filename;

v. open file from previous step in Photoshop and align, OR isolate and save more individual frames to merge together in Adobe Bridge;

w. using Adobe Bridge select all the Individual frames save; then select Photomerge, then select auto then select OK;

x. check for double vision errors in Adobe Photoshop by superimposing the left panoramic view and the right panoramic view and selecting the top layer to the Blend Mode Difference;

y. correct double vision areas by using the Adobe Photoshop tools Stamp tool;

z. save the Left and Right Equirectangular panoramic views;

aa. open Pano2VR;

bb. drag the Left Equirectangular panoramic view to the T-shaped cubes; then select Transformation; then select Cube Faces with Image size, 4096×4096, then Name and save;

cc. drag the Right Equirectangular panoramic view to the T-shaped cubes then select 60 Transformation; then select Cube Faces with Image size: 4096×4096; then Name and save; and dd. open Lightroom then Import the 4096×4096 px cube faces created in Pano2VR, select all of them.

5. The method for creating a stereoscopic panoramic image of an interior of a vehicle in accordance with claim 4, further comprising: placing a vehicle on a ground having a horizontal surface in an enclosure having at least 10 feet clearance on all sides of the vehicle and above the vehicle.

6. The method for creating a stereoscopic panoramic image of an interior of a vehicle in accordance with claim 4, further comprising: incorporating the images of the interior of the vehicle to create a cube with six faces, the six faces being a front image of the cube numbered 0 including a steering wheel, a front windshield, a portion of the driver's window, a center console, and an instrument panel, a right side of the cube numbered 1 containing images of a passenger seat, a passenger door, the center console, the passenger window, a portion of a front windshield, and a portion of the passenger rear window, the rear side of the cube numbered 2 containing images of the rear seats, a rear window, and a rear of the interior of the car, a left side of the cube numbered 3 containing images of a driver door, the driver window, and a portion of the driver's seat, the top of the cube numbered 4 containing images of the roof of the car, and the image number 5 being the bottom of the cube containing images of the driver's seat.

* * * * *